United States Patent [19]

Gerszberg et al.

[11] Patent Number: 5,528,597
[45] Date of Patent: Jun. 18, 1996

[54] AUTONOMOUS SYNCHRONIZATION OF BASE STATIONS IN A DIGITAL WIRELESS RADIOTELEPHONE NETWORK

[75] Inventors: Irwin Gerszberg, Kendall Park; Srini Ramamurthy, Lake Hiawatha, both of N.J.

[73] Assignee: AT&T Corp., Murray Hill, N.J.

[21] Appl. No.: 517,312

[22] Filed: Aug. 21, 1995

Related U.S. Application Data

[63] Continuation of Ser. No. 228,976, Apr. 18, 1994, abandoned.

[51] Int. Cl.$^6$ .................................................. H04B 7/212
[52] U.S. Cl. ...................... 370/95.3; 370/105.2; 375/356; 455/51.1
[58] Field of Search .......................... 455/51.1, 54.1; 375/354, 356, 357, 358; 370/95.3, 100.1, 103, 105.2

[56] References Cited

U.S. PATENT DOCUMENTS

| | | | |
|---|---|---|---|
| 5,128,925 | 7/1992 | Dornstetter et al. | 455/51.1 |
| 5,241,688 | 8/1993 | Arora | 455/51.1 |
| 5,260,944 | 11/1993 | Tomabechi | 370/103 |
| 5,355,515 | 10/1944 | Sicher | 455/51.1 |

*Primary Examiner*—Benedict V. Safourek
*Attorney, Agent, or Firm*—Alfred G. Steinmetz

[57] ABSTRACT

An apparatus and method synchronizes a communication frame of a newly added base station, in a Time Division Multiple Access (TDMA) communication network, to communication frames in the existing communication network of base stations by operating the newly added base station to receive down link signals of a neighboring active base station and synchronize its receive slot in the communication frame with a corresponding forward time slot of the communication frame of that base station. The receive time slot of the newly added base station is shifted by an offset reference time to establish it own forward time slot. The offset reference time is determined by the time interval required for the base station to change from a forward to a reverse channel.

8 Claims, 4 Drawing Sheets

AUTONOMOUS SYNCHRONIZATION OF BASE STATIONS IN A DIGITAL WIRELESS RADIOTELEPHONE NETWORK

This application is a continuation of application Ser. No. 08/228,976 filed on Apr. 18, 1994, now abandoned.

FIELD OF THE INVENTION

This invention relates to a method and apparatus for the synchronization of a plurality of base stations serving as radio ports in a digital wireless radiotelephone network such as a personal communication network (PCN) and in particular synchronizing a newly added wireless base station with active wireless base stations included within the network.

BACKGROUND OF THE INVENTION

The synchronism of individual base stations in a wireless radiotelephone system is important to operate the system at its highest efficiency. In time division radio systems (TDMA) lack of synchronism may cause co-channel interference between adjacent base stations. If two stations use a common frequency (co-channel) in different time slots, lack of synchronization may lead to frequency interference between the two channels. This is a limitation on how often a particular frequency may be reused.

Lack of synchronism also requires resynchronism of the mobile radiotelephones at each handoff, which consumes valuable transmission time. This results in a considerable "mute time" in the operation of the radiotelephone. Personal communication Network (PCN) communication devices, for example, have frequent handoffs and hence mute time is a significant consideration. A lack of synchronization prohibits the application of slow frequency hopping techniques from being applied to a wireless communication network.

Despite its desirability, synchronism may require elaborate network schemes to ensure that all base stations are synchronized. It is desirable to achieve system synchronism with the simplest system arrangement that is reliable.

SUMMARY OF THE INVENTION

An apparatus and method, embodying principles of the invention, synchronizes a communication frame of a newly added base station, in a Time Division Multiple Access (TDMA) communication network, to frames in the existing communication network of base stations by operating the newly added base station to receive down link signals of a neighboring active base station and synchronize its receive slot in the communication frame with a corresponding forward time slot of the communication frame of that base station. The receive time slot of the newly added base station is shifted by an offset reference time to establish it own forward time slot. The offset reference time is determined method and apparatus based on the interval of time required for the base station to change from a forward to a reverse channel.

In a particular embodiment, a TDMA cellular/wireless communications system includes a plurality of radio port base stations all connected to a landline telephone network. Each radio port base station can listen to the digital control channel of neighboring radio port base stations. A new radio port base station being entered into the system listens by radio to nearby radio port base stations already operative within the system and decodes the digital control channel of the active nearby radio port. It receives a forward channel signal from the operative active nearby radio port and by using a known time offset between forward and reverse TDMA frames used in the system it changes its own frame timing to synchronize its forward and reverse channel time slots with those of the active radio port base station. This synchronization is achieved by each newly added radio port base station automatically as it is added to the communication system.

The present system has the advantage of being decentralized. Hence loss or failure of a radio port does not inhibit maintenance or establishment of synchronization between the remaining radio ports.

DETAILED DESCRIPTION

Figure 1:
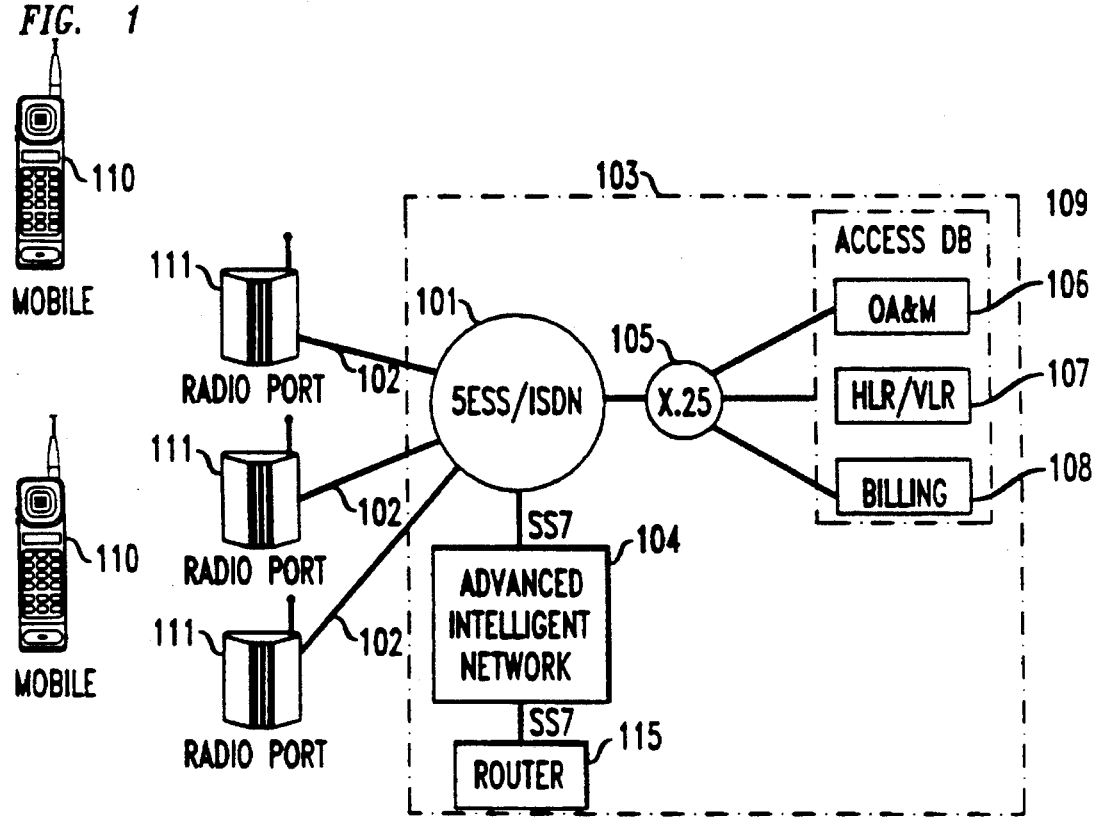
FIG. 1 is a schematic of a TDMA communication network in which the invention is applicable.

A plurality of radio port base stations 111, 112 and 113 are shown in FIG. 1 as being connected to a Integrated Services Digital network (ISDN) telephone switch 101 of a public switched telephone network (PSTN) 103, via a bit rate interface line (BRI) 102. This is a typical ISDN nB+D BRI interface whose operation and structure is well known to those skilled in the art and it is not believed necessary to describe it herein in detail. Control of the feature benefits and personal call management controlling calls through the radio port base stations 111, 112 and 113 to mobile personal radiotelephone subscriber units (SU) 110 is under control of an Advanced intelligent network (AIN) 104 which couples the ISDN switch 101 to a router 115 which controls the user features designated personal call management. An access management data base 109 is coupled to the ISDN switch 101 and includes call management items, such as a home/visitor location register (HLR/VLR) 107, a billing data base 108 and an operations, administration and management (OA&M) data base 106. Communication between this access management data base 109 and the ISDN switch 101 is via an X.25 messaging network 105.

Each radio port 111, 112 and 113 has the capability of listening to nearby or neighboring radio port to receive its digital control channel transmissions (i.e. a channel primarily used for transmission of digital control information from a mobile unit to a radio port and vice versa). This listening capability is used by each radio port to seek out and find its neighbors and to establish a data base recording and storing this information in a separate data base within each radio port.

Handoffs of subscriber units (SU) from one radio port to another are carried out over the ISDN X.25 link shown in the FIG. 1. This process is greatly enhanced if the radio ports are all in synchronization with one another.

Figure 2:
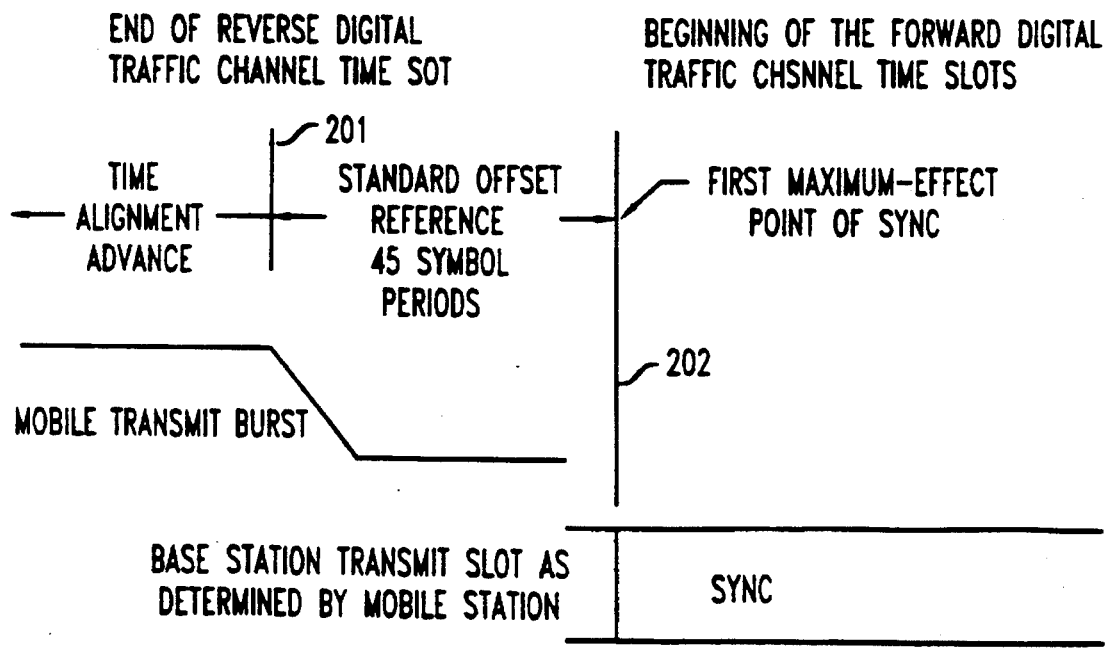
FIG. 2 is a graph of the relationship between a forward and reverse channel in a wireless communication system.

The radio port base stations are operated in synchronism with one another. Any base stations added to the system must be synchronized with the existing active base stations of the system. Synchronization, as performed herein, is based on the fixed timing relationship between the forward and reverse links of the base stations. In a forward link messages pass from a base station to a mobile station and in the reverse link the message flow is from the mobile station to the base station. This relation is graphically shown in the graph of FIG. 2. The end of a reverse time slot at 201 is followed by a standard offset reference period to allow for certain processes between reverse and forward links to be processed. The forward link begins at 202 which is at the end of the offset reference period. The beginning of the forward time slot is the synchronizing mark of the base station transmit slot.

Figure 3:
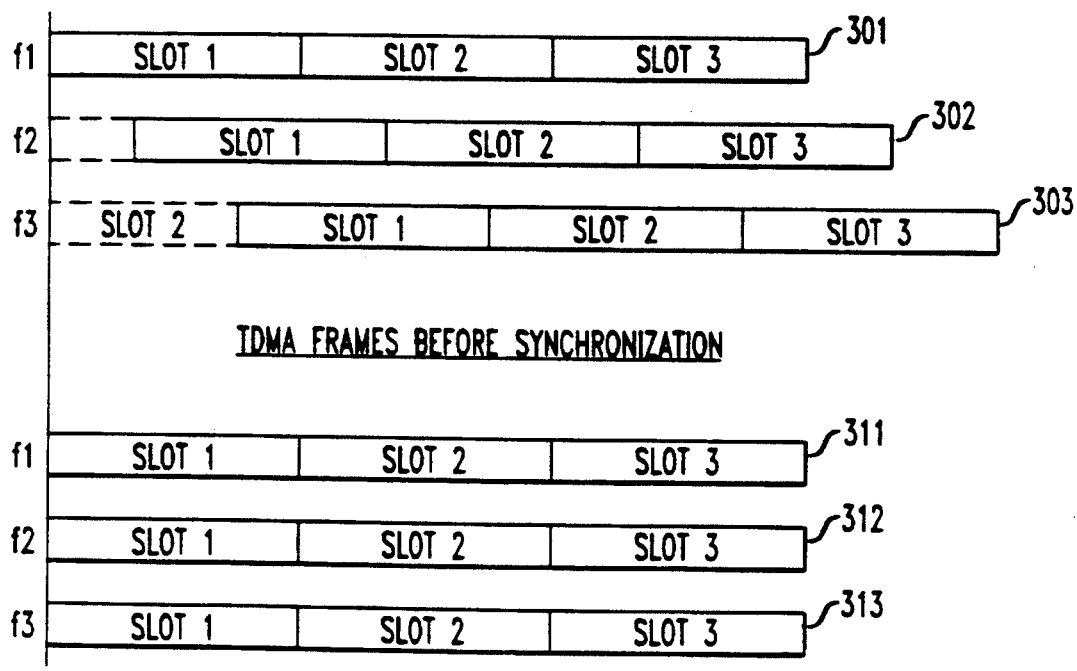
FIG. 3 is a timing diagram of TDMA frames before and after synchronization.

The unsynchronized relation of TDMA frames (i.e. time slots) between an active station and a newly added base station are shown by the unsynchronized graphically depicted time slots or frames 301, 302 and 303 in the FIG. 3. As indicated the frames of the slots 302 lag the slots of 301 and precede the slots of 303. In the synchronized system the frames of the slots 311, 312 and 313 are all synchronized with one another. The advantages of synchronization include the reduction of interference between base stations. An additional advantage is the avoidance of the need of individual mobile radiotelephones to resynchronize when handed off from one base station to another base station. Without the advantage of a synchronized system the mobile radiotelephone must tune to a new base station frequency and then synchronize itself to a particular time slot of the forward channel of the new base station. This process could absorb several hundred milliseconds and is required every time the radiotelephone is assigned a new frequency and time slot. Synchronization is needed to permit some transmission systems such as those using slow frequency hopping.

As shown in the FIG. 3 the corresponding frames at each transmission frequency are simultaneous with one another after the frames are synchronized. This permits a mobile communicator to change channels from one frame to another without a need to pause for synchronization with a new frame.

Figure 4:
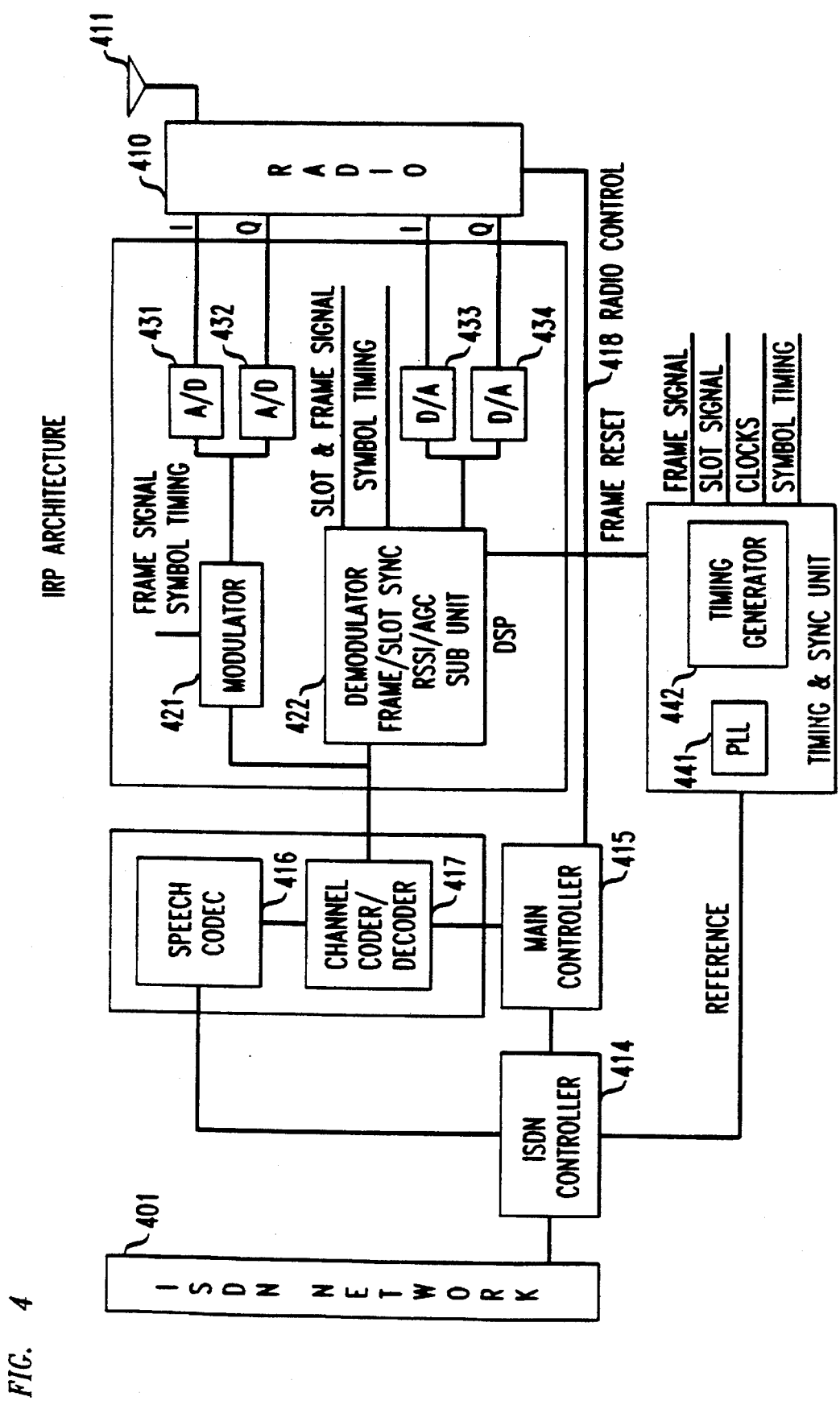
FIG. 4 is a block schematic of a radio port base station used in the TDAM communication network of FIG. 1.

A radio port operative as a base station in the synchronization scheme is shown in the FIG. 4. it is connected to a ISDN network 401 which is typically part of a landline telephone network. It has a radio circuit 410 for communicating, through an antenna 411, with radiotelephone personal communicators. It includes an ISDN controller 414 and a main controller 415. It includes a speech codec 416 and a channel coder/decoder 417 under control of the ISDN controller 414 and the main controller 415, respectively. The speech codec 416 and channel coder/decoder 417 are embodied as digital signal processors. The main controller is also connected to provide radio control, via lead 418.

Signal processing between the channel coder/decoder 416 and the radio 410 includes a modulator circuit 421, a demodulator circuit 422 with signal strength and synchronization circuitry each embodied in a digital signal processor. The modulator circuit 421 is connected to the digital-to-analog converters 431, 432 which couple it to the radio 410. The demodulator circuit 422 is connected to the analog-to-digital converters 433, 434 which are in turn connected to the radio 410.

A timing and synchronization unit includes a phase lock loop (PLL) 441 for accepting and synchronizing with a timing signal from the ISDN network 401. It keeps the base station locked to a time reference of the ISDN network. A timing generator 442 generates frame and slot timing signals and clock pulses and symbol timing signals. These two timing modules are connected to the demodulator circuit 422.

When the base station of FIG. 4 is initially connected to an existing system of base stations, its receive radio circuitry is controlled to scan for the presence of neighboring base stations. it detects and decodes the base station identification codes of these neighboring base stations. In this decoding process the base station of FIG. 4 synchronizes to a forward channel (e.g. normally its digital control channel) of a detected neighboring base station. With synchronization achieved, the base station, of FIG. 4, now calculates the offset value based on the fixed timing relationship between the forward and reverse channels of the radio ports in the system and returns to its normal operation.

During the normal operation, of this base station, the frame timing for its forward channel is derived from the offset value between its forward and reverse channels and by the frame timing for the communication system. The stored program controls in the base station are set to observe this offset value and maintain it in synchronization with its neighboring base stations.

Figure 5:
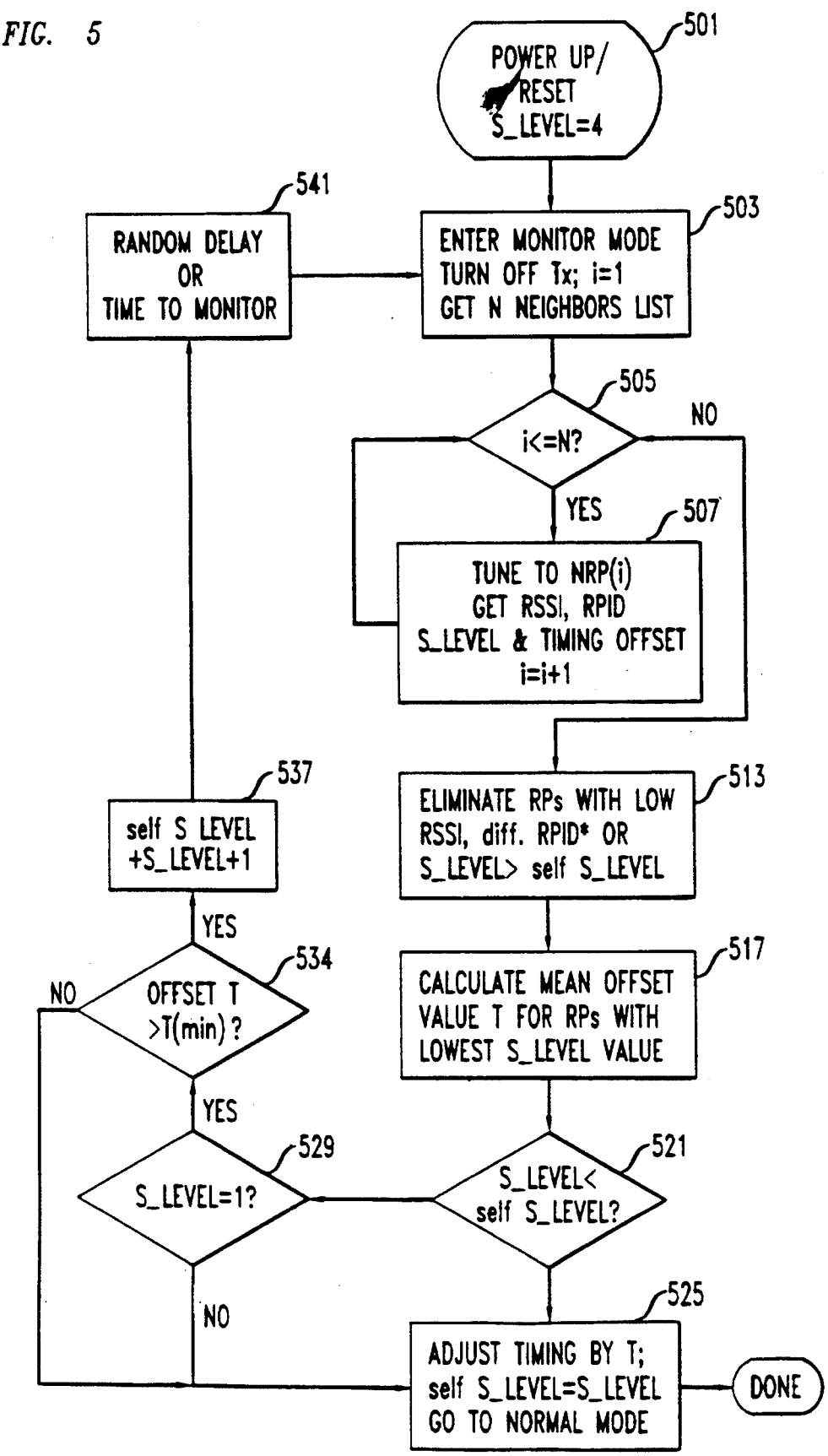
FIG. 5 is a flow chart of the synchronization procedure for a newly added radio port base station.

This process is clearly delineated by the flow chart of FIG. 5. At power up the base station is reset as indicated in the start terminal 501 and sets the initial S_LEVEL synchronization level to some self S_LEVEL value 4. The S-LEVEL value to be determined is a numerical measure of the degree of synchronization with a nearby radio port. The base station now enters it monitoring phase as indicated in instruction block 503. The variable i is set to one and the radio transmitter is turned off. A list of N neighboring radio ports is generated by listening to the digital control channel. The variable i is compared with N, the number of neighbors in the decision block 505. If the variable i is less than the term N the process proceed to the instruction block 507 in which the process is continuously cycled until all the neighboring base stations have been communicated with and their frame/slot timing, radio port identification number RPID and RSSI information has been acquired. The S_LEVEL and timing offset information is also acquired. This information is used to calculate an offset value with each neighboring base station and these values are stored in memory in a table of RSSIs and offset values "t".

The variable i is incremented with each cycle and the flow returns to the decision block 505. When all the neighboring base station have been contacted the flow proceeds from block 505 to the instruction block 513. Radio ports RPs with low RSSI or with an S_LEVEL greater than the interrogating radio port are eliminated from further consideration in the synchronization process. In the case of intersystem synchronization involving two or more different communication systems RPs with different RPIDs are also included. The flow process proceeds to the block 517 whose instructions calculate the average offset values T for RPs with the lowest S_LEVEL values.

This S_LEVEL value obtained is compared with the interrogating RP's self S_LEVEL value in the decision block 521. If the S_LEVEL is less than the self S-LEVEL the flow process proceeds to the instruction block 525. The instructions of block 525 adjusts the timing T (by the offset level) so that the self S_LEVEL matches the acquired S_LEVEL and synchronizes the self radio port with the nearby radio port. The radio port than enters its normal operating mode in synchronism with the nearby radio ports. The base station is now enabled to operate in a normal mode in synchronization with its neighbors having its frame timing adjusted by the appropriate S_LEVEL value If the self S_LEVEL value is equal to or less than the S_LEVEL value acquired the flow process proceeds to the decision block 529 to inquire if the S-LEVEL value is equal to 1. If it is not the flow returns to the block 525 whose operation is described above. If the S-LEVEL equals 1 the flow proceeds to decision block 534 to determine if the offset value T is greater than some minimum value T(min). If it is not the flow proceeds to block 525. If the offset time exceeds the value T(min) the flow proceeds to block 537 which increments the S-LEVEL by one and sets the self S_LEVEL to that value. The instructions of subsequent block 541 sets a random time value to the process and the flow returns to the block 503 wherein the synchronization process repeats.

This synchronization process is repeated periodically to counter any changes due to drift/offset over time. If RSSI values are too low the base station will operate independently of synchronization.

This synchronization technique provides many advantages. Handoff of communicators from one base station to another may be accomplished by retuning the communicator with out need for access bursts to acquire alignment values from the intended base station. It also reduces co-channel interference between different base stations because the timing slots are aligned. With the synchronization attained techniques such as slow frequency hopping is readily usable.

We claim:

1. A method of synchronizing communication channel frames of a radio base station newly added to a digital TDM radiotelephone communication network, in which different communication channels are operative in differing time slots of a communication channel frame, to a frame of a radio base station already operative in the radiotelephone communication network;

comprising the steps of:

scanning the frequency spectrum of forward channels of the radio base stations already operative with radio reception equipment in the radio base station newly added;

synchronizing a receive channel slot of a frame of the radio base station newly added with a received forward channel slot of a nearby one of the radio base stations already operative;

adding an offset timing value to the synchronized receive channel to determine the timing of a frame of the forward channel of the radio base station newly added.

2. A method of synchronizing communication channel frames of a radio base station newly added to a digital TDM radiotelephone communication network, as claimed in claim 1:

the step of scanning further including tuning to the digital control channel frequency of a neighboring radio port base station.

3. A method of synchronizing communication channel frames of a radio base station newly added to a digital TDM radiotelephone communication network, as claimed in claim 1:

the step of synchronizing further including equating synchronizing with a numerical value and eliminating from consideration nearby radio port base stations with unsatisfactory numerical values representative of its synchronization with the communication network.

4. A method of synchronizing a newly added radio port base station upon power up with an active radio port base station acting as a reference in a wireless communication system;

comprising the steps of:

setting in the newly added radio port base station a preliminary numerical self value for a synchronization level S-LEVEL that defines the degree of attainment of synchronization with a selected reference;

activating a radio receiver in the newly added radio port base station to tune in to digital control channels of a plurality of nearby active radio port base stations;

recording the present S-LEVEL value with respect to each of the plurality of active radio port base stations;

eliminating from consideration for synchronization purposed those of the plurality of radio port base stations having a S-LEVEL greater than a preliminary self-S-LEVEL of the newly added radio port;

adjusting timing of the newly added radio port when the self S-LEVEL is equal to an acquired S-LEVEL from one of the plurality of active radio port stations.

5. A method of synchronizing a newly added radio port base station upon power up with an active radio port base station acting as a reference in a wireless communication system; as claimed in claim 4:

further including a step of periodically resynchronizing to counteract drift in the synchronization of the newly added radio port to the active radio ports.

6. A method of synchronizing a newly added radio port base station upon power up with an active radio port base station acting as a reference in a wireless communication system; as claimed in claim 4:

wherein the step of adjusting the timing includes determining an offset time and comparing the offset time with a minimum value as a prerequisite to setting the timing.

7. A method of synchronizing a newly added radio port base station upon power up with an active radio port base station acting as a reference in a wireless communication system; as claimed in claim 4:

wherein the newly added and active radio port base stations are in a common system and radio port base stations with different identification from that of the system are eliminated from synchronizing consideration.

8. A method of synchronizing a newly added radio port base station upon power up with an active radio port base station acting as a reference in a wireless communication system; as claimed in claim 4:

wherein the newly added and active radio port are in different systems and radio port base stations with different identification from that of the newly added radio port base station are included in synchronization consideration.

* * * * *